G. H. RAFLOVICH.
DEVICE FOR REPAIRING PNEUMATIC TIRES.
APPLICATION FILED FEB. 29, 1912.
1,048,208.
Patented Dec. 24, 1912.
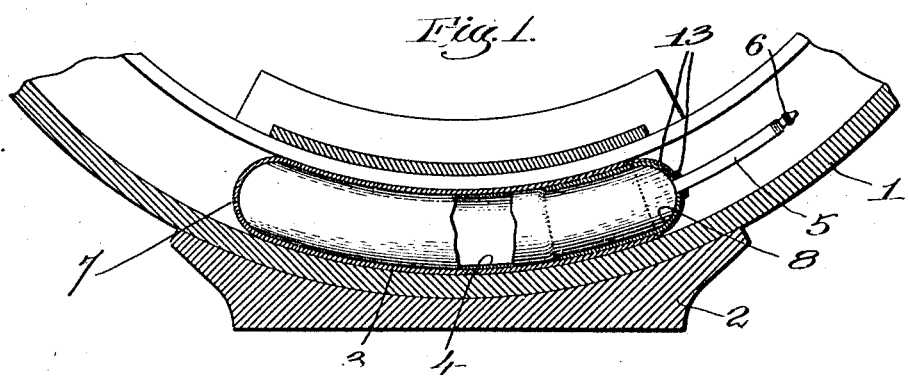
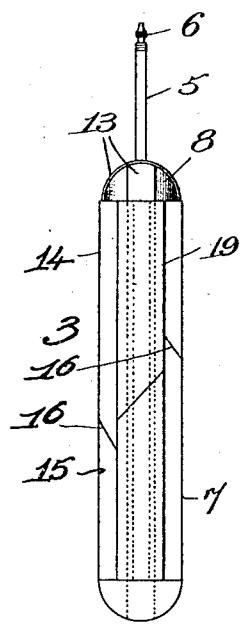
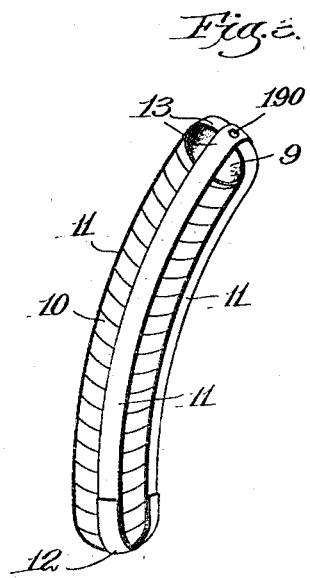
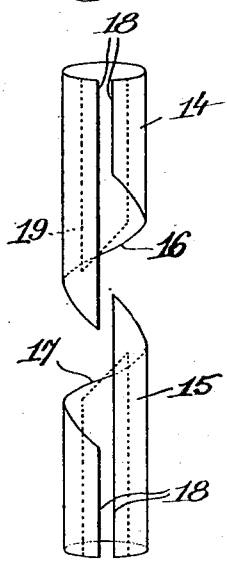
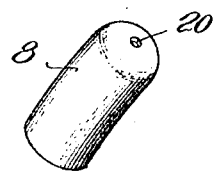

UNITED STATES PATENT OFFICE.

GUSTAF H. RAFLOVICH, OF BOSTON, MASSACHUSETTS.

DEVICE FOR REPAIRING PNEUMATIC TIRES.

1,048,208.  Specification of Letters Patent.  Patented Dec. 24, 1912.

Application filed February 29, 1912. Serial No. 680,603.

*To all whom it may concern:*

Be it known that I, GUSTAF H. RAFLOVICH, a citizen of the United States, residing at Boston, county of Suffolk, State of Massachusetts, have invented an Improvement in Devices for Repairing Pneumatic Tires, of which the following description, in connection with the accompanying drawing, is a specification, like characters on the drawing representing like parts.

This invention relates to a device to be used in repairing punctures and breaks in pneumatic tires.

It frequently happens that the shoe or outer casing of a pneumatic tire becomes damaged in one part owing to a blow-out, puncture, or some other cause, before the rest of the tire is worn to any great extent, and under such conditions it is of great advantage to be able to repair the damaged portion of the tire. One method now employed in thus repairing a damaged portion of the tire is to apply a patch and a reinforcing quantity of rubber or other material to the damaged part of the tire and then place said tire in a mold and insert in the tire a mandrel to preserve its shape interiorly and then to subject the tire to the vulcanizing process.

It has been heretofore proposed to employ a mandrel in the form of an inflatable cartridge which could be inserted within the tire at the damaged portion thereof and could be filled with air or gas under sufficient pressure to hold the tire interiorly in its proper shape.

My invention relates particularly to a cartridge or inflatable mandrel of this type and the object of the invention is to provide a simple device of this nature which can be inexpensively manufactured.

Referring to the drawings wherein I have illustrated a preferred embodiment of my invention, Figure 1 is a longitudinal section through a mold with a portion of a tire therein and showing my improved inflatable mandrel; Fig. 2 is a side view of the mandrel; Fig. 3 is a perspective view of one section of the mandrel; Fig. 4 is a view showing the exterior wrapping or jacket for the mandrel; Fig. 5 is a perspective view of the cap.

1 designates a portion of a tire which may be either the outer shoe or casing of a double tube tire or may be a single tube tire.

2 designates a mold in which the damaged portion of the tire is placed, and 3 designates generally the inflatable mandrel within the tire for preserving its proper shape during the vulcanizing process, it being understood that the mold 2 with the tire therein and the mandrel are placed in a suitable vulcanizing apparatus in order to vulcanize the patch on the damaged portion of the tire.

My improved mandrel comprises an outer casing and an inner inflatable chamber within the casing. The inner chamber is designated 4 and is made of rubber so that it can be expanded in a manner similar to the inner tube of an ordinary pneumatic tire. This inner inflatable chamber has connected thereto a pipe or tube 5 which is provided at its end with a suitable valve 6 and through which air or gas may be pumped into the chamber to inflate it. The outer casing is formed of two parts, a body portion designated generally 7 which is open at one end, as at 9, and a cap 8 adapted to set into said open end.

In making the body portion of the outer casing I first wrap strips of canvas spirally about a mandrel, as shown at 10, in Fig. 3, and then place stay strips 11 longitudinally of the body. These stay strips on opposite sides of the body are formed from the same piece of material, and said piece being carried beyond the open end 9 of the body and bent to form the loops 13. At the closed end of the body the stay strips overlap each other, as shown at 12. Outside of the stay strips I place an envelop or jacket of canvas or similar material, and in the present embodiment said jacket is shown as formed of two strips 14 and 15 of canvas, each cut on the bias at one end, as at 16 and 17, and each wrapped about the body, as shown in Fig. 2. The inclined edges 16, 17 of the sections 14, 15 meet each other and the meeting edges 18 of the two sections are covered by a strip 19, as shown in Fig. 2. These strips of canvas are properly cemented together and then the whole structure is vulcanized to make an integral body.

The cap 8 may be made in any suitable way and it is of a size to telescope into the body, as shown in Fig. 1. The loops 13 are provided with the apertures 190 through which the tube 5 may extend.

In using my improved device the inner inflatable chamber 4 is inserted into the open end of the body 7 of the cartridge, it being understood that the loops 13 may be swung down to one side to entirely uncover said open end and then the cap 8 is applied, said cap having an aperture 20 through which the stem 5 may project. The stem 5 is then passed through the opening 190 in the loops 13 and the latter are swung into their operative position over the end of the cap 8, as seen in Fig. 2. The cartridge when thus assembled is ready for use and the required pressure within it may be secured by either pumping air or gas thereinto or by placing therein a suitable quantity of water which will be vaporized by the heat developed during the vulcanizing process thereby to form within the chamber sufficient steam pressure to hold the tube interiorly in its required shape.

The manner in which my improved mandrel is used for repairing a tire after said mandrel has been inserted into the tire is well known to those skilled in the art and need not be further referred to.

My improved mandrel can be manufactured very simply and inexpensively and it will operate effectively to hold the tire in shape interiorly during the vulcanizing process. The use of loops or straps 13 for holding the cap in the body 7 avoids the necessity of using any metal-retaining means for securing the cap in place and makes not only an efficient holding device for the cap, but enables me to make the outer casing comparatively pliable.

Having fully described my invention what I claim as new and desire to secure by Letters Patent is:—

1. In a device of the class described, the combination with an inner inflatable chamber having a valved tube 5 connected thereto, of an outer casing comprising an open-ended body and a cap to fit into said end, said cap having an opening through which said tube extends, and retaining straps 13 secured to the body and projecting beyond the open end thereof and adapted to embrace the cap and hold the latter in position, said straps having an aperture 19 through which the tube extends.

2. In a device of the class described, the combination with an inner inflatable chamber having a valved tube extending from one end thereof, of an outer casing comprising an open-ended body 7 and a cap fitting into said open end, said body having formed as an integral part thereof strips 11 which extend longitudinally thereof and project beyond the open end to form the holding loops 18 which embrace the cap and hold it in place, each loop having an aperture through which the valved tube extends.

In testimony whereof, I have signed my name to this specification in the presence of two subscribing witnesses.

GUSTAF H. RAFLOVICH.

Witnesses:
 Louis C. Smith,
 Thomas J. Drummond.